United States Patent
Hayashi

(10) Patent No.: US 12,235,427 B2
(45) Date of Patent: Feb. 25, 2025

(54) OBSERVATION APPARATUS

(71) Applicant: Evident Corporation, Tatsuno-machi (JP)

(72) Inventor: Shinichi Hayashi, Tokyo (JP)

(73) Assignee: Evident Corporation, Nagano (JP)

( * ) Notice: Subject to any disclaimer, the term of this patent is extended or adjusted under 35 U.S.C. 154(b) by 648 days.

(21) Appl. No.: 17/542,602

(22) Filed: Dec. 6, 2021

(65) Prior Publication Data

US 2022/0091402 A1    Mar. 24, 2022

Related U.S. Application Data

(63) Continuation of application No. PCT/JP2020/022636, filed on Jun. 9, 2020.

(30) Foreign Application Priority Data

Jun. 10, 2019  (JP) ................................. 2019-107620

(51) Int. Cl.
  G02B 21/00 (2006.01)
  G02B 21/06 (2006.01)
  G02B 21/36 (2006.01)

(52) U.S. Cl.
  CPC ..... G02B 21/0032 (2013.01); G02B 21/0064 (2013.01); G02B 21/06 (2013.01); G02B 21/365 (2013.01)

(58) Field of Classification Search
  CPC ............ G02B 21/0032; G02B 21/0064; G02B 21/06; G02B 21/365; G02B 19/00
  See application file for complete search history.

(56) References Cited

U.S. PATENT DOCUMENTS

| 2,616,334 | A | | 11/1952 | Frits |
| 4,062,619 | A | | 12/1977 | Hoffman |
| 5,731,894 | A | * | 3/1998 | Gross ..................... G02B 21/02 |
| | | | | 359/371 |
| 6,376,842 | B1 | * | 4/2002 | Yamada .............. H01J 37/3174 |
| | | | | 250/398 |
| 6,657,787 | B1 | * | 12/2003 | Otaki ..................... G02B 27/46 |
| | | | | 359/618 |
| 9,091,855 | B2 | * | 7/2015 | Sakaguchi ......... G02B 27/1066 |

(Continued)

FOREIGN PATENT DOCUMENTS

FR          1059123 A       3/1954
JP       08190054 A  *    7/1996

(Continued)

OTHER PUBLICATIONS

Japanese Office Action (and English language translation thereof) dated Oct. 4, 2022, issued in counterpart Japanese Application No. 2019-107620.

(Continued)

*Primary Examiner* — Mustak Choudhury
(74) *Attorney, Agent, or Firm* — Holtz, Holtz & Volek PC

(57) ABSTRACT

An observation apparatus includes a first intensity modulation section arranged on an optical path of illumination light with which an observation object is to be irradiated, the first intensity modulation section modulating an intensity distribution of the illumination light, and a second intensity modulation section arranged on an optical path of observation light from the observation object irradiated with the illumination light, the second intensity modulation section modulating an intensity distribution of the observation light.

20 Claims, 22 Drawing Sheets

(56) References Cited

U.S. PATENT DOCUMENTS

| | | | | |
|---|---|---|---|---|
| 2001/0026397 | A1* | 10/2001 | Nishida | G02B 21/16 |
| | | | | 359/368 |
| 2002/0021490 | A1* | 2/2002 | Kasahara | G02B 21/0004 |
| | | | | 359/368 |
| 2006/0238858 | A1* | 10/2006 | Kawasaki | G02B 21/025 |
| | | | | 359/368 |
| 2014/0098416 | A1* | 4/2014 | Schmidt | G02B 21/14 |
| | | | | 359/370 |
| 2018/0073865 | A1 | 3/2018 | Suzuki et al. | |
| 2018/0224646 | A1* | 8/2018 | Wakui | G02B 21/086 |
| 2019/0113458 | A1* | 4/2019 | Kozawa | G02B 21/36 |
| 2021/0311294 | A1 | 10/2021 | Hayashi | |

FOREIGN PATENT DOCUMENTS

| | | |
|---|---|---|
| JP | H08190054 A | 7/1996 |
| JP | H11064735 A | 3/1999 |
| JP | 2000010007 A | 1/2000 |
| JP | 2002031758 A | 1/2002 |
| JP | 2003131139 A | 5/2003 |
| JP | 2010281889 A | 12/2010 |
| JP | 2014515500 A | 6/2014 |
| JP | 2016145874 A | 8/2016 |
| JP | 2020085988 A | 6/2020 |
| WO | 2016185729 A1 | 11/2016 |

OTHER PUBLICATIONS

International Search Report (ISR) (and English language translation thereof) dated Aug. 18, 2020, issued in International Application No. PCT/JP2020/022636.

Written Opinion dated Aug. 18, 2020, issued in International Application No. PCT/JP2020/022636.

* cited by examiner

OBSERVATION APPARATUS

CROSS REFERENCE TO RELATED APPLICATIONS

This application is based upon and claims the benefit of priority of the prior Japanese Patent Application No. 2019-107620, filed Jun. 10, 2019, the entire contents of which are incorporated herein by reference.

This is a Continuation Application of PCT Application No. PCT/JP2020/022636, filed Jun. 9, 2020, which was not published under PCT Article 21(2) in English.

BACKGROUND OF THE INVENTION

Field of the Invention

The present disclosure relates to an observation apparatus.

Description of the Related Art

As one of methods of observing living cells with no staining, differential interference contrast microscopy (hereinafter referred to as DIC method) has been known. The DIC method is an observation method for visualizing an observation object with a contrast between light and shade caused by an interference between polarized light beams, and is described in French Patent No. 1059123, for example. The DIC method is excellent in terms of easily grasping a state of growth of living cells and the like because an image with three-dimensional effect that depends on a brightness corresponding to a phase gradient (hereinafter referred to as a phase gradient image) can be obtained.

SUMMARY OF THE INVENTION

An observation apparatus according to an aspect of the present invention includes a first intensity modulation section arranged on an optical path of illumination light with which an observation object is to be irradiated, the first intensity modulation section modulating an intensity distribution of the illumination light, and a second intensity modulation section arranged on an optical path of observation light from the observation object irradiated with the illumination light, the second intensity modulation section modulating an intensity distribution of the observation light. A first light utilization ratio distribution of the first intensity modulation section decreases in a first orientation, and a second light utilization ratio distribution of the second intensity modulation section increases in a second orientation corresponding to the first orientation.

An observation apparatus according to another aspect of the present invention includes an illumination optical system that irradiates an observation object with illumination light, an observation optical system that guides observation light from the observation object into a detector, and an intensity modulation section that modulates an intensity distribution of the illumination light and an intensity distribution of the observation light. The illumination optical system and the observation optical system share an objective lens. The intensity modulation section is arranged at an exit pupil position of the objective lens or a position optically conjugate with the exit pupil position, and a light utilization ratio distribution of the intensity modulation section decreases in a predetermined orientation perpendicular to an optical axis of the objective lens.

BRIEF DESCRIPTION OF THE DRAWINGS

The present invention will be more apparent from the following detailed description when the accompanying drawings are referenced.

DESCRIPTION OF THE EMBODIMENTS

In DIC method for obtaining a phase gradient image using polarized light, a dedicated objective lens and a dedicated condenser lens that are low-strain are usually used to prevent the polarized light from being disturbed. Accordingly, an apparatus used for the DIC method is liable to be expensive, and a technique for obtaining a phase gradient image of an observation object by inexpensive equipment has been demanded.

Embodiments of the present invention will be described below.

Figure 1:
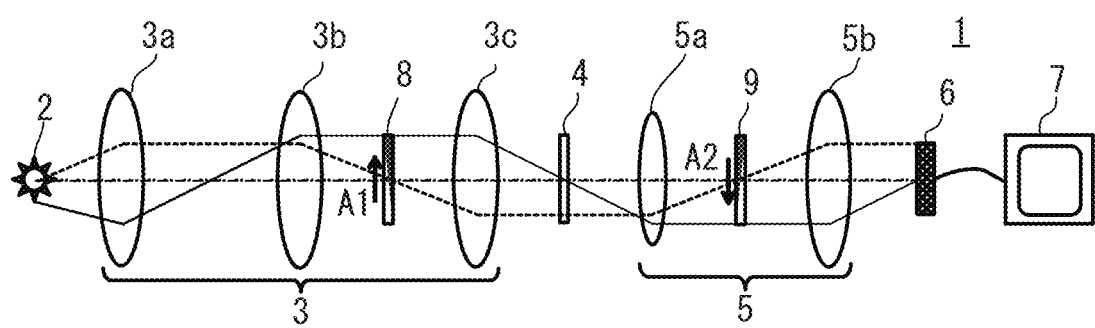
FIG. 1 is a diagram illustrating a configuration of a microscope apparatus 1.

FIG. 1 is a diagram illustrating a configuration of a microscope apparatus 1. The microscope apparatus 1 illustrated in FIG. 1 is an observation apparatus that obtains a phase gradient image similar to an image to be obtained by a differential interference microscope.

The microscope apparatus 1 includes a modulation element 8 arranged on an optical path of illumination light with which an observation object 4 is to be irradiated and a modulation element 9 arranged on an optical path of observation light from the observation object 4 irradiated with the illumination light. The microscope apparatus 1 may further include a light source 2, an illumination optical system 3, an observation optical system 5, an image pickup device 6, and a display device 7.

The light source 2 is a halogen lamp, for example. The light source 2 emits the illumination light for illuminating the observation object 4. The illumination optical system 3 irradiates the observation object 4 with the illumination light emitted from the light source 2. The observation optical system 5 guides the observation light into the image pickup device 6. The image pickup device 6 is a detector such as a CCD (charge-coupled device) image sensor or a CMOS (complementary metal-oxide-semiconductor) image sensor, for example. The image pickup device 6 is an example of an image acquisition section that acquires image data of the observation object 4 based on the observation light from the observation object 4 modulated by the modulation element 9. Examples of the display device 7 include a liquid crystal display, an organic EL display (OELD), and a CRT (cathode ray tube) display. The display device 7 displays a phase gradient image of the observation object 4 similar to the image to be obtained by the differential interference microscope.

The modulation element 8 is an example of a first intensity modulation section that modulates an intensity distribution of illumination light. The modulation element 8 is an optical filter that emits transmitted light that has been dimmed for incident light. The modulation element 8 is specifically a gradation filter, for example. The modulation element 8 has an intensity transmittance distribution that monotonously decreases in an orientation indicated by an arrow A1 (hereinafter referred to as a first orientation). The modulation element 8 is arranged at a pupil position of the illumination optical system 3 including a lens 3a, a lens 3b, and a lens 3c, for example.

The modulation element 9 is an example of a second intensity modulation section that modulates an intensity distribution of observation light. The modulation element 9 is an optical filter that emits transmitted light that has been dimmed for incident light, and is specifically a gradation filter, for example. The modulation element 9 has an intensity transmittance distribution that monotonously increases in an orientation indicated by an arrow A2 (hereinafter referred to as a second orientation) corresponding to the first orientation. The modulation element 9 is arranged at a pupil position of the observation optical system 5 including a lens 5a and a lens 5b, for example.

In this specification, a "direction" is defined by a straight line, and an "orientation" is defined by an arrow. In this specification, one of two orientations, which are opposite to each other, defined by a certain direction is represented as a positive orientation of the certain direction, and the other of the two orientations is represented as a negative orientation of the certain direction. That is, for example, a north orientation is represented as a positive orientation of a south-north direction, and a south orientation is represented as a negative orientation of the south-north direction. "Positive" or "negative" itself has no particular meaning. Therefore, a north orientation may be represented as a negative orientation of the south-north direction, and a south orientation may be represented as a positive orientation of the south-north direction.

In this specification, a "monotonous decrease" includes a case where a decrease gradually occurs in at least three or more steps in addition to a case where a decrease continuously and monotonously occurs. That is, a monotonous decrease of an intensity transmittance in a first orientation means that a differential value of the intensity transmittance distribution corresponding to the first orientation is zero or less at any position, and a minimum value of the differential value is not zero. A "monotonous increase" includes a case where an increase gradually occurs in at least three or more steps in addition to a case where an increase continuously and monotonously occurs. That is, a monotonous increase of an intensity transmittance in a second orientation means that a differential value of the intensity transmittance distribution corresponding to the second orientation is zero or more at any position, and a maximum value of the differential value is not zero.

In this specification, "corresponding orientations" on two planes perpendicular to an optical axis are respectively defined by positions where any light beams to be incident on both the planes pass through the two planes. Specifically, when the two planes are respectively a plane FP1 and a plane FP2, and positions where light beams to be incident on both the plane FP1 and the plane FP2 pass through the plane FP1 and the plane FP2 are respectively a position PP1 and a position PP2, an orientation toward the position PP1 from the optical axis on the plane FP1 and an orientation toward the position PP2 from the optical axis on the plane FP2 are respectively orientations corresponding to each other. If the two planes are respectively at positions optically conjugate with each other, when a vector defined on one of the planes is projected onto the other plane, an orientation of the vector before the projection on the one plane and an orientation of the vector after the projection on the other plane are respectively orientations corresponding to each other. In this example, when a vector in the first orientation at a position of the modulation element 8 is projected onto a position of the modulation element 9, an orientation of the vector projected onto the position of the modulation element 9 is a second orientation. Therefore, the first orientation and the second orientation correspond to each other.

As described above, when the modulation element 8 and the modulation element 9 are arranged such that the modulation element 8 has an intensity transmittance distribution that monotonously decreases in a first orientation and the modulation element 9 has an intensity transmittance distribution that monotonously increases in a second orientation corresponding to the first orientation, the modulation element 8 and the modulation element 9 have a complementary relationship with respect to the intensity transmittance distributions. The complementary relationship herein referred to means a relationship in which a light beam that has passed through a region having a higher intensity transmittance in the modulation element 8 passes through a region having a lower intensity transmittance in the modulation element 9 when the observation object 4 has no phase gradient, and as a result means a relationship in which an intensity transmittance distribution (hereinafter referred to as a composite intensity transmittance distribution) obtained by synthesizing an intensity transmittance distribution of the modulation element 8 and an intensity transmittance distribution of the modulation element 9 comes closer to uniformity than one of the intensity transmittance distributions of the modulation element 8 and the modulation element 9.

Figure 2A:
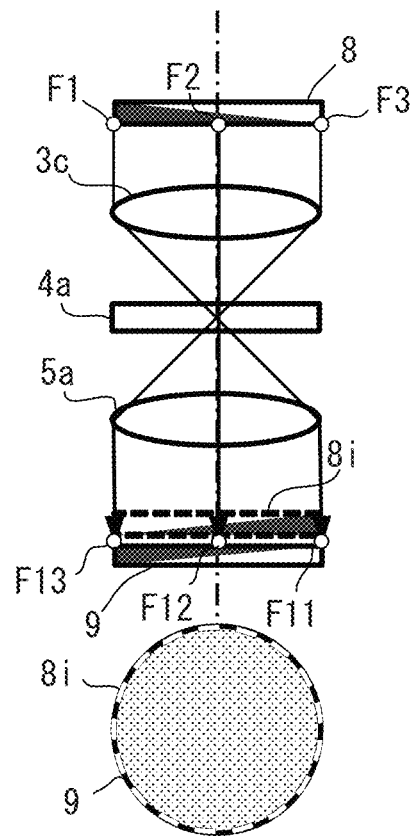
FIG. 2A is a diagram for describing respective functions of a modulation element 8 and a modulation element 9.
Figure 2B:
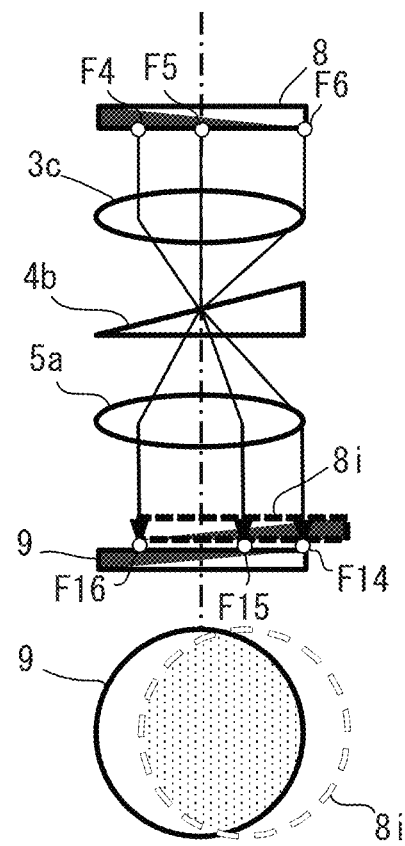
FIG. 2B is another diagram for describing respective functions of the modulation element 8 and the modulation element 9.
Figure 2C:
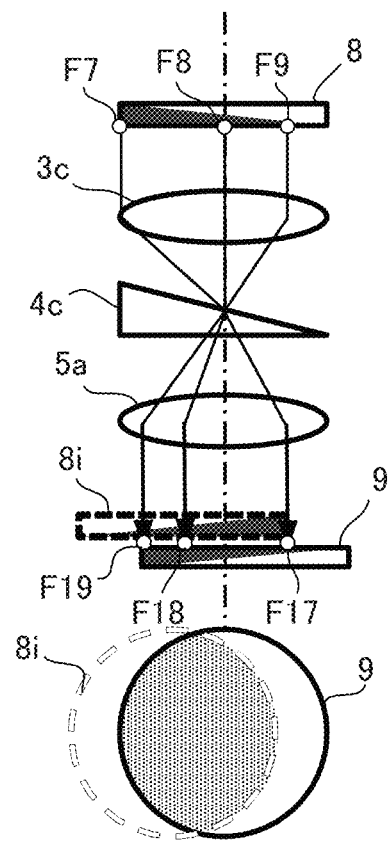
FIG. 2C is still another diagram for describing respective functions of the modulation element 8 and the modulation element 9.
Figure 3:
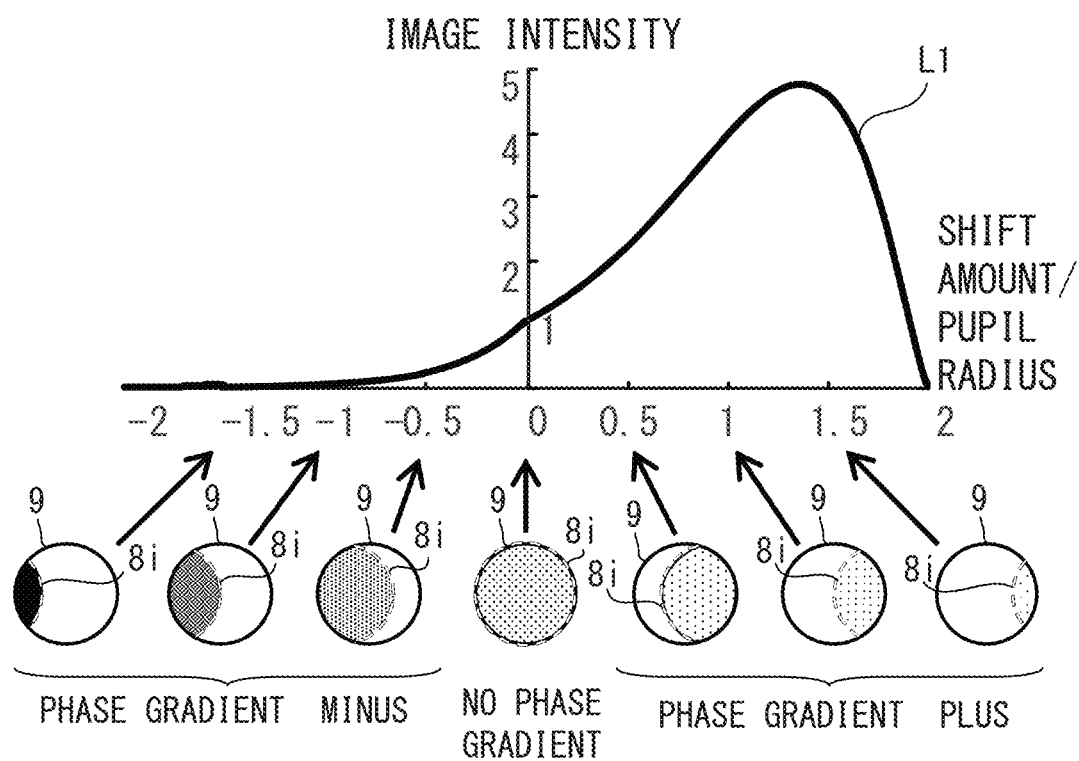
FIG. 3 is a diagram illustrating a relationship between a shift amount and an image intensity.

FIGS. 2A to 2C are diagrams for describing respective functions of the modulation element 8 and the modulation element 9. FIG. 3 is a diagram illustrating a relationship between a shift amount and an image intensity. As illustrated in FIG. 2A to FIG. 2C, a position on which a projected image 8i of the modulation element 8 is projected shifts in a direction perpendicular to an optical axis depending on a phase gradient of the observation object 4. Specifically, when a portion 4a having no phase gradient in the observation object 4 is observed, as illustrated in FIG. 2A, the portion 4a can be considered as a parallel flat plate. Accordingly, the projected image 8i is projected around the optical axis. On the other hand, the projected image 8i shifts in a positive orientation of the direction perpendicular to the optical axis when a portion 4b having a positive phase gradient is observed, as illustrated in FIG. 2B, and the projected image 8i shifts in a negative orientation of the direction perpendicular to the optical axis when a portion 4c having a negative phase gradient is observed, as illustrated in FIG. 2C.

Accordingly, in the microscope apparatus 1 in which the modulation element 8 and the modulation element 9 have a complementary relationship with respect to the intensity transmittance distributions, the composite intensity transmittance distribution changes depending on the phase gradient of the observation object. Specifically, although the composite intensity transmittance distribution has a substantially flat characteristic by the complementary relationship between the modulation element 8 and the modulation element 9 regardless of the presence or absence of the phase gradient of the observation object, a value of the composite intensity transmittance and a range in which the value of the composite intensity transmittance is not zero change depending on the phase gradient of the observation object. As a result, the microscope apparatus 1 can obtain a phase gradient image by visualizing the phase gradient of the observation object 4 because each point of the observation object 4 is projected onto the image pickup device 6 at a brightness corresponding to the phase gradient.

More specifically, when the portion 4a having no phase gradient in the observation object 4 is observed, a light beam that has passed through a point F2 as a center of a pupil of the illumination optical system 3 passes through a point F12 as a center of a pupil of the observation optical system 5, as illustrated in FIG. 2A. A light beam that has passed through a point F1 and a point F3 as ends of the pupil of the illumination optical system 3 passes through a point F11 and a point F13 as ends of a pupil of the observation optical system 5. Accordingly, the composite intensity transmittance distribution has a moderate value in the entire pupil of the observation optical system 5. Therefore, the portion 4a having no phase gradient in the observation object 4 is projected onto the image pickup device 6 at a moderate brightness (an image intensity of one), as illustrated in FIG. 3.

When the portion 4b having a positive phase gradient is observed, a light beam that has passed through a point F5 as the center of a pupil of the illumination optical system 3 passes through a point F15 deviating from the center of a pupil of the observation optical system 5, as illustrated in FIG. 2B. The modulation element 9 has a higher intensity transmittance at the point F15 than that at a point on an optical axis. Accordingly, the composite intensity transmittance distribution has a higher value than that when the portion 4a, having no phase gradient, is observed. Further, a light beam that has passed through a point F6 as one end of the pupil of the illumination optical system 3 passes through a point F16 inside one end of the pupil of the observation optical system 5. That is, a light beam is not incident on the one end of the pupil of the observation optical system 5. Accordingly, the composite intensity transmittance distribution has a value that is not zero in not the entire area of the pupil but only a part of the pupil of the observation optical system 5. A light beam that has passed through the other end of the pupil of the illumination optical system 3 is vignetted halfway, and is not incident on the pupil of the observation optical system 5. A light beam that has passed through a point F4 inside the other end of the pupil of the illumination optical system 3 is incident on a point F14 as one end of the pupil of the observation optical system 5. Therefore, the portion 4b having a positive phase gradient in the observation object 4 is projected onto the image pickup device 6 at a higher brightness than the portion having no phase gradient, as illustrated in FIG. 3, because an amount of increase in a value of the composite intensity transmittance exceeds an amount of decrease in a range in which the value of the composite intensity transmittance is not zero.

When the portion 4c having a negative phase gradient is observed, a light beam that has passed through a point F8 as the center of a pupil of the illumination optical system 3 passes through a point F18 deviating from the center of a pupil of the observation optical system 5, as illustrated in FIG. 2C. The modulation element 9 has a lower intensity transmittance at the point F18 than that at a point on an optical axis. Accordingly, the composite intensity transmittance distribution has a lower value than that when the portion 4a, having no phase gradient, is observed. Further, a light beam that has passed through a point F7 as one end of the pupil of the illumination optical system 3 passes through a point F17 inside one end of the pupil of the observation optical system 5. That is, a light beam is not incident on the one end of the pupil of the observation optical system 5. Accordingly, the composite intensity transmittance distribution has a value that is not zero in not the entire area of the pupil but a part of the pupil of the observation optical system 5. A light beam that has passed through the other end of the pupil of the illumination optical system 3 is vignetted halfway, and is not incident on the pupil of the observation optical system 5. A light beam that has passed through a point F9 inside the other end of the pupil of the illumination optical system 3 is incident on a point F19 as one end of the pupil of the observation optical system 5. Therefore, the portion 4c having a negative phase gradient in the observation object 4 is projected onto the image pickup device 6 at a lower brightness than the portion having no phase gradient, as illustrated in FIG. 3, because a value of the composite intensity transmittance decreases and a range in which the value of the composite intensity transmittance is not zero also decreases.

A horizontal axis illustrated in FIG. 3 indicates a value obtained by dividing a shift amount of the projected image 8i based on an optical axis by a pupil radius. That is, a state where the value indicated by the horizontal axis is zero is a state where the projected image 8*i* is projected onto the optical axis, and a state where the value indicated by the horizontal axis is ±1 is a state where the projected image 8*i* is projected onto a position that has shifted from the optical axis by the pupil radius. A state where the value indicated by the horizontal axis is ±2 is a state where the projected image 8*i* has shifted from the optical axis by a pupil diameter. When the value indicated by the horizontal axis exceeds 2 or is below −2, the projected image 8*i* is projected outside the modulation element 9. Accordingly, an image intensity is zero. A vertical axis illustrated in FIG. 3 indicates an image intensity. The image intensity is obtained by integrating the composite transmittance distribution on the entire area of the pupil of the observation optical system 5, and is standardized such that the image intensity in a shift amount of zero, i.e., in no phase gradient is one.

As described above, in the microscope apparatus 1, the shift amount monotonously changes depending on the phase gradient, and the image intensity monotonously changes depending on the shift amount. As a result, an amount of the phase gradient is converted into a magnitude of the image intensity. Accordingly, the phase gradient of the observation object 4 can be visualized. That is, the microscope apparatus 1 makes it possible to visualize the phase gradient only by respectively arranging modulation elements having a complementary relationship in the illumination optical system 3 and the observation optical system 5 and to obtain a phase gradient image of the observation object in an inexpensive equipment configuration.

Although an example in which the modulation element 8 and the modulation element 9 are respectively arranged at the pupil position of the illumination optical system 3 and the pupil position of the observation optical system 5 has been illustrated in FIG. 1, the modulation element 8 may be arranged at a position optically conjugate with the pupil of the illumination optical system 3. The modulation element 9 may be arranged at a position optically conjugate with the pupil of the observation optical system 5. In the case, an optically conjugate relationship between the respective positions of the modulation element 9 and the modulation element 8 is also maintained. Further, as long as the optically conjugate relationship between the respective positions of the modulation element 9 and the modulation element 8 is maintained, the modulation element 8 may be arranged in the vicinity of the pupil position of the illumination optical system 3. The modulation element 8 may be arranged in the vicinity of the position optically conjugate with the pupil of the illumination optical system 3. As long as the optically conjugate relationship between the respective positions of the modulation element 9 and the modulation element 8 is maintained, the modulation element 9 may be arranged in the vicinity of the pupil position of the observation optical system 5, or may be arranged in the vicinity of the position optically conjugate with the pupil of the observation optical system 5.

Figure 4:
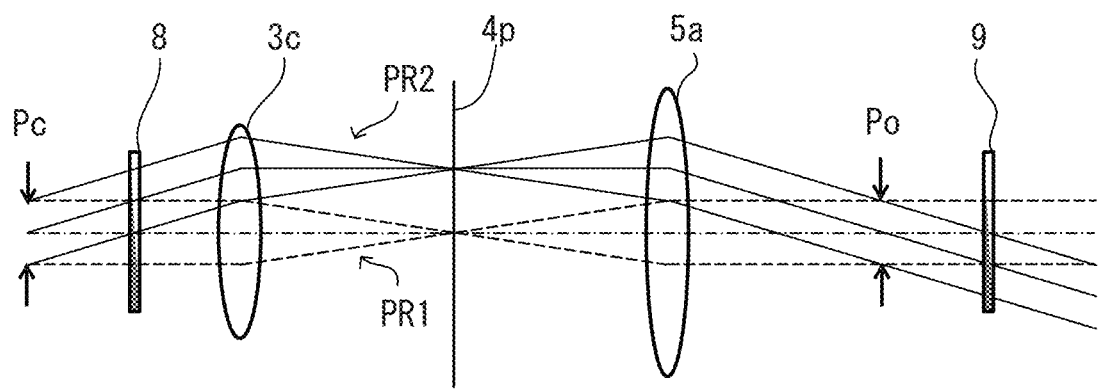
FIG. 4 is a diagram for describing respective functions of the modulation element 8 and the modulation element 9 in a case where the modulation elements are arranged in the vicinity of a pupil position.

FIG. 4 is a diagram for describing respective functions of the modulation element 8 and the modulation element 9 in a case where the modulation elements are arranged in the vicinity of a pupil position. In FIG. 4, an on-axis ray bundle PR1 and an off-axis ray bundle PR2 are drawn. Even when the modulation elements are respectively arranged at positions deviating from the pupil position, as illustrated in FIG. 4, if a product of an intensity transmittance of the modulation element 8 and an intensity transmittance of the modulation element 9 for a principal ray in the bundle of light beams transmitted by each position of an object surface 4*p* and forming an image of the object surface 4*p* is substantially uniform regardless of the position of the object surface 4*p*, a complementary relationship is satisfied. This can be restated as follows: a product of a first light utilization ratio of the first intensity modulation section and a second light utilization ratio of the second intensity modulation section with respect to the on-axis principal ray forming an optical image of an observation object is substantially equivalent to a product of a first light utilization ratio of the first intensity modulation section and a second light utilization ratio of the second intensity modulation section with respect to off-axis principal ray forming the optical image. A height of the off-axis rays at a position deviating from a pupil position (a pupil position Po and a pupil position Pc) is larger than that at the pupil position. Accordingly, a larger modulation element is required when arranged at a position deviating from the pupil position than when arranged at the pupil position. Therefore, the modulation element 8 and the modulation element 9 are desirably respectively arranged at the pupil position, positions optically conjugate with a pupil, or their respective vicinities.

Although an example in which the modulation element 9 is arranged at a position optically conjugate with the modulation element 8 has been illustrated in FIG. 1, the first intensity modulation section and the second intensity modulation section may have a complementary relationship with respect to the intensity transmittance distributions. A positional relationship between the first intensity modulation section and the second intensity modulation section is not limited to an optically conjugate relationship. For example, the first intensity modulation section and the second intensity modulation section may be arranged without an optical system being sandwiched therebetween but with an observation object sandwiched therebetween, as illustrated in FIG. 5.

Figure 5:
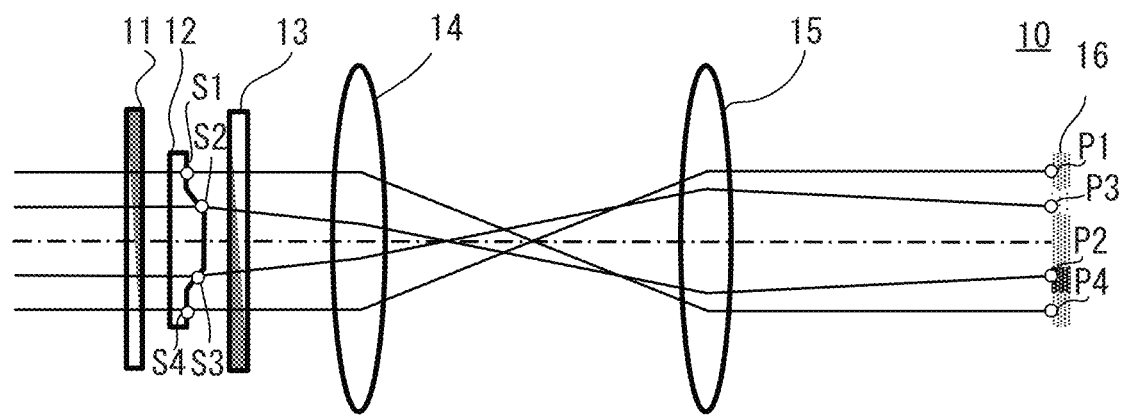
FIG. 5 is a diagram illustrating a configuration of an observation apparatus 10.

FIG. 5 is a diagram illustrating a configuration of an observation apparatus 10. The observation apparatus 10 illustrated in FIG. 5 includes a modulation element 11 arranged on an optical path of illumination light with which an observation object 12 is to be irradiated, a modulation element 13 arranged on an optical path of observation light from the observation object 12 irradiated with the illumination light, a lens 14 and a lens 15 for guiding the observation light into an image pickup device 16, and the image pickup device 16. The modulation element 11 and the modulation element 13 are arranged with the observation object 12 sandwiched therebetween.

The modulation element 11 has an intensity transmittance distribution that monotonously decreases and is an example of the first intensity modulation section that modulates an intensity distribution of illumination light. The modulation element 13 has an intensity transmittance distribution that monotonously increases and is an example of the second intensity modulation section that modulates an intensity distribution of observation light. The modulation element 11 and the modulation element 13 are arranged such that an orientation in which the intensity transmittance distribution of the modulation element 11 monotonously decreases and an orientation in which the intensity transmittance distribution of the modulation element 13 monotonously increases are the same. In this case, when there is no phase gradient in the observation object 12, a light beam that has passed through a region having a higher intensity transmittance in the modulation element 11 passes through a region having a lower intensity transmittance in the modulation element 13. Accordingly, the first intensity modulation section and the second intensity modulation section have a complementary relationship with respect to the intensity transmittance distributions.

Accordingly, even in the observation apparatus 10, flat portions (a point S1 and a point S4) having no phase gradient in the observation object 12 are projected onto the image pickup device 16 (a pixel P1 and a pixel P4) at an intermediate brightness, and portions (a point S2 and a point S3) having a phase gradient in the observation object 12 are projected onto the image pickup device 16 (a pixel P2 and a pixel P3) at a brightness corresponding to the phase gradient, as illustrated in FIG. 5. Therefore, the observation apparatus 10 makes it possible to visualize the phase gradient, like the microscope apparatus 1.

Embodiments of the present invention will be specifically described below.

First Embodiment

Figure 6:
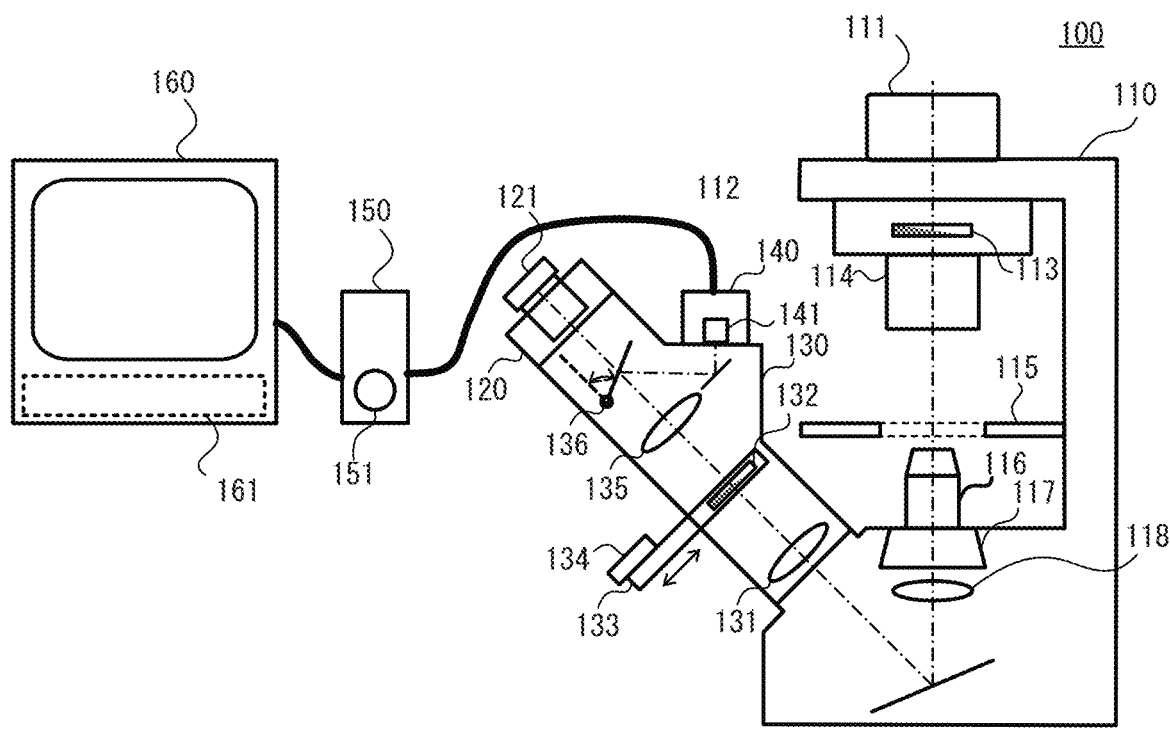
FIG. 6 is a diagram illustrating a configuration of a microscope apparatus 100 according to a first embodiment.
Figure 7:
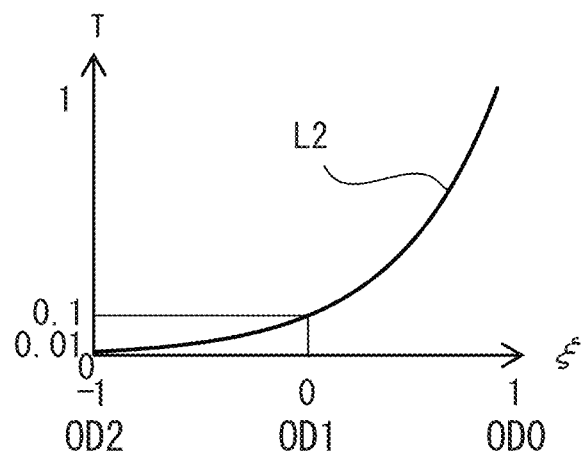
FIG. 7 is a diagram illustrating an intensity transmittance distribution of a modulation element 113.
Figure 8:
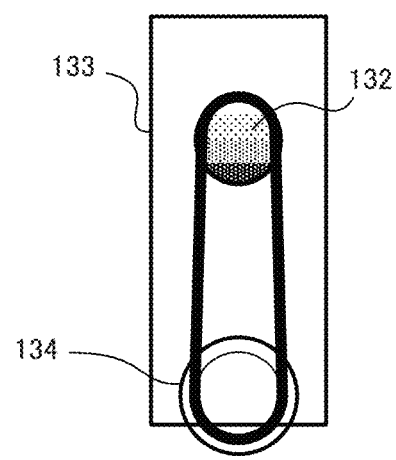
FIG. 8 is a diagram for describing a method of adjusting a modulation element 132.
Figure 9:
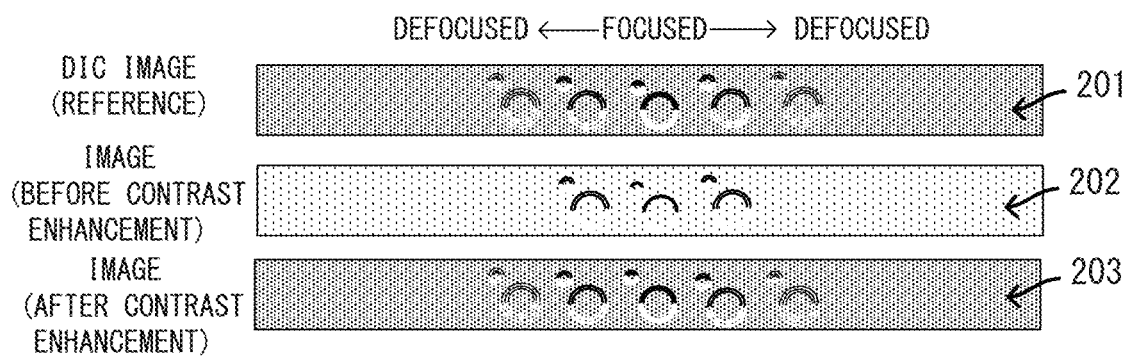
FIG. 9 is a diagram illustrating an effect of contrast enhancement processing.

FIG. 6 is a diagram illustrating a configuration of a microscope apparatus 100 according to the present embodiment. FIG. 7 is a diagram illustrating an intensity transmittance distribution of a modulation element 113. FIG. 8 is a diagram for describing a method of adjusting a modulation element 132. FIG. 9 is a diagram illustrating an effect of contrast enhancement processing.

The microscope apparatus 100 includes an inverted microscope including an adapter 130 between a base 110 and a lens barrel 120, a camera 140, a control device 150, and a display device 160, as illustrated in FIG. 6.

The base 110 includes a light source 111, the modulation element 113, a condenser 114, a stage 115, an objective lens 116, a nose piece 117, and an imaging lens 118. The lens barrel 120 is a monocular or binocular lens barrel, and includes an eyepiece lens 121.

The modulation element 113 is an example of the above-described first intensity modulation section, and is a gradation filter arranged at a pupil position of the condenser 114. The modulation element 113 has an intensity transmittance distribution that monotonously decreases in a first orientation, as illustrated in FIG. 7. In FIG. 7, T represents an intensity transmittance, and $\xi$ represents a position in the first orientation in a pupil plane. The position $\xi=0$ is a position of the center of the pupil plane. The positions $\xi=-1$ and 1 are respectively positions of ends of a pupil on the pupil plane. The intensity transmittance distribution of the modulation element 113 represents an optical density (OD) 1 at the position $\xi=0$, represents an optical density (OD) 2 at the position $\xi=-1$, and represents an optical density (OD) 0 at the position $\xi=1$. That is, the intensity transmittance distribution of the modulation element 113 has a linear characteristic in the first orientation when converted into an optical density. In still other words, an optical density distribution represented by the intensity transmittance distribution of the modulation element 113 is a linear distribution in the first orientation.

The adapter 130 includes an optical path switching mirror 136. When a position the optical path switching mirror 136 is changed, a visual observation state where an optical image formed by the imaging lens 118 is projected onto a front focal point of the eyepiece lens 121 and a shooting state where the optical image formed by the imaging lens 118 is projected onto the camera 140 can be switched.

The adapter 130 further includes a relay lens 131, the modulation element 132, a slider 133, a dial 134, and a relay lens 135. The slider 133 in which the modulation element 132 is installed is provided between the relay lens 131 and the relay lens 135. When the slider 133 is inserted into a predetermined position, an image of the modulation element 113 is projected onto the modulation element 132.

The modulation element 132 is an example of the above-described second intensity modulation section, and is a gradation filter arranged at a pupil conjugate position of the objective lens 116. The modulation element 132 has an intensity transmittance distribution that monotonously increases in a predetermined orientation. The modulation element 132 changes in orientation in synchronization with rotation of the dial 134 provided in the slider 133, as illustrated in FIG. 8. Therefore, a user can adjust an orientation in which the intensity transmittance monotonously increases by operating the dial 134. The user performs the adjustment such that the intensity transmittance distribution of the modulation element 132 monotonously increases in a second orientation corresponding to the first orientation. As a result, the modulation element 113 and the modulation element 132 have a complementary relationship with respect to the intensity transmittance distributions. An optical density distribution represented by the intensity transmittance distribution of the modulation element 132 is desirably a linear distribution in the second orientation.

The camera 140 is an image acquisition section that acquires image data of an observation object based on light from an observation object guided by the observation optical system, and includes an image pickup device 141. The camera 140 may perform enhancement processing for enhancing a contrast of an image of the observation object to be displayed on the display device 160 based on image data. That is, the camera 140 is an image acquisition section, and may be a contrast enhancement section.

The control device 150 is a control device that controls the camera 140, and includes a dial 151. When the user rotates the dial 151, the microscope apparatus 100 can adjust an enhancement amount of the contrast in the enhancement processing. The control device 150 may be a control device that controls the display device 160. In this case, when the user rotates the dial 151, the display device 160 may perform the enhancement processing for enhancing the contrast of the image of the observation object to be displayed on the display device 160 based on image data.

The display device 160 includes a contrast enhancement section 161 that enhances the contrast of the image of the observation object based on the image data.

The microscope apparatus 100 configured as described above makes it possible to form an optical image of the observation object on the camera 140 at a brightness corresponding to a phase gradient by the complementary relationship between the modulation element 113 and the modulation element 132. Accordingly, an image 202 and an image 203 as phase gradient images similar to an image 201 to be obtained by a differential interference microscope can be obtained, as illustrated in FIG. 9. In the microscope apparatus 100, the modulation element 113 and the modulation element 132 have a linear optical density distribution. Accordingly, the brightness can be smoothly changed depending on the phase gradient. The image 201, the image 202, and the image 203 are images each obtained by shooting two large and small hemispherical objects. The image 202 is an image the contrast of which has not been enhanced by the camera 140, and the image 203 is an image the contrast of which has been enhanced by the camera 140.

In the microscope apparatus 100, the modulation element 113 and the modulation element 132 convert the phase gradient into an image intensity, and further enhances a contrast caused by a difference in image intensity by image processing. As a result, an image in which the phase gradient is visually recognizable with a sufficient contrast can be obtained, as indicated by the image 203 illustrated in FIG. 9. In the microscope apparatus 100, a higher resolution can be realized than that in the differential interference microscope that forms an image by shifting and synthesizing an ordinary light beam and an extraordinary light beam.

In the microscope apparatus 100, a phase gradient image can be obtained by only adding the adapter 130 to the existing microscope and further arranging the modulation element 113 at a pupil position of the condenser 114. Therefore, the microscope apparatus 100 makes it possible to obtain a phase gradient image of an observation object by an inexpensive configuration using the existing microscope apparatus. In the microscope apparatus 100, a phase gradient image can be obtained without depending on an optical polarization characteristic, unlike in the differential interference microscope. Accordingly, the observation object can be observed while being accommodated in a plastic container in which polarized light is easily disturbed.

Figure 10:
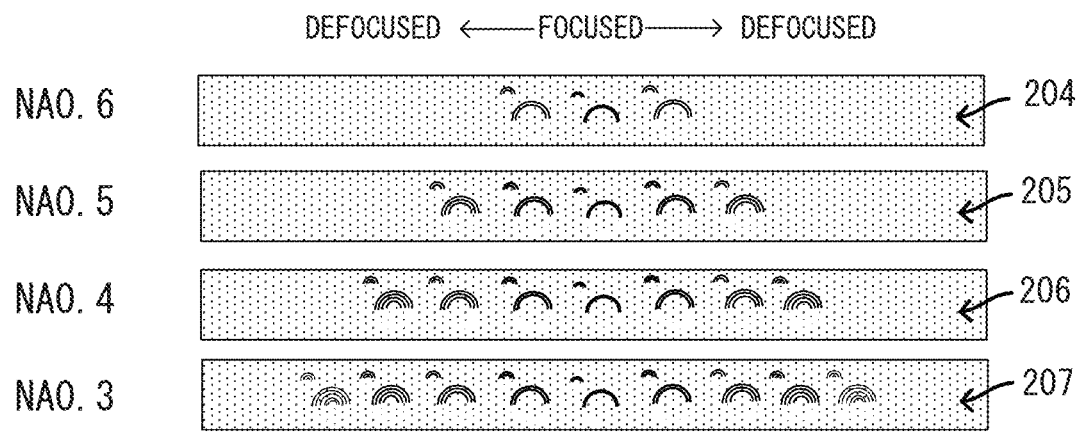
FIG. 10 is a diagram illustrating an example of a relationship between a numerical aperture of an illumination optical system and a contrast of an image.
Figure 11:
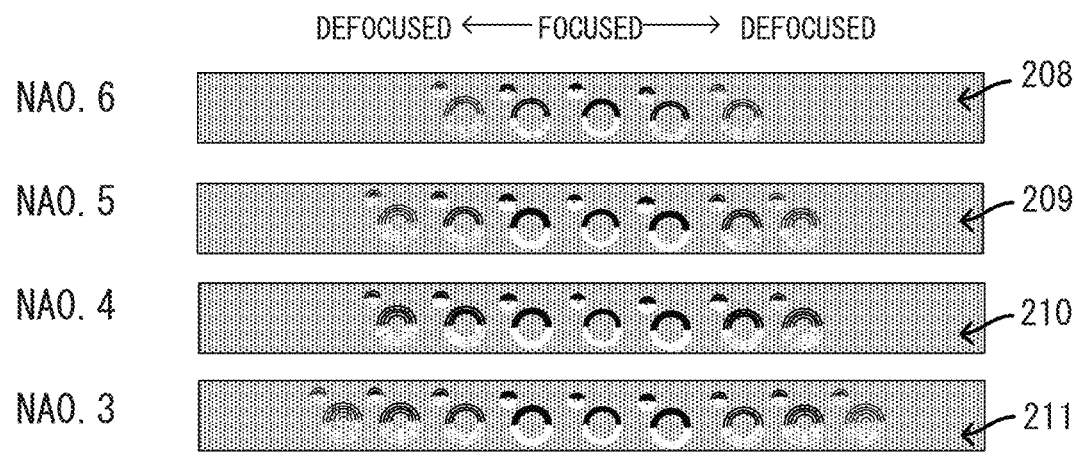
FIG. 11 is a diagram illustrating another example of a relationship between a numerical aperture of an illumination optical system and a contrast of an image.

FIG. 10 and FIG. 11 are diagrams each illustrating a relationship between a numerical aperture of an illumination optical system and a contrast of an image. The microscope apparatus 100 may have an aperture stop on an illumination optical path, which is not illustrated in FIG. 6. The aperture stop desirably has a structure for adjusting an aperture diameter. When the numerical aperture of the illumination optical system is adjusted using the aperture stop, a defocus characteristic changes. Each of an image 204 to an image 207 illustrated in FIG. 10 is an image the contrast of which has not been enhanced by image processing and is an image obtained when the numerical aperture (NA) of the illumination optical system restricted by the aperture stop is gradually decreased from 0.6 to 0.3. Each of an image 208 to an image 211 illustrated in FIG. 11 is an image the contrast of which has been enhanced by image processing and is an image obtained when the numerical aperture (NA) of the illumination optical system restricted by the aperture stop is gradually decreased from 0.6 to 0.3. As illustrated in FIG. 10 and FIG. 11, when the numerical aperture of the illumination optical system is decreased, a depth of focus increases. Accordingly, an observation object can be easily searched for even in a defocused state.

The aperture stop may further have a centering structure. When an inclination with respect to an optical axis of a principal ray is adjusted by the centering structure, an event in which an image position changes with defocusing can be prevented from occurring. The aperture stop desirably has at least one of the structures for adjusting an aperture diameter and the centering structure.

Figure 12:
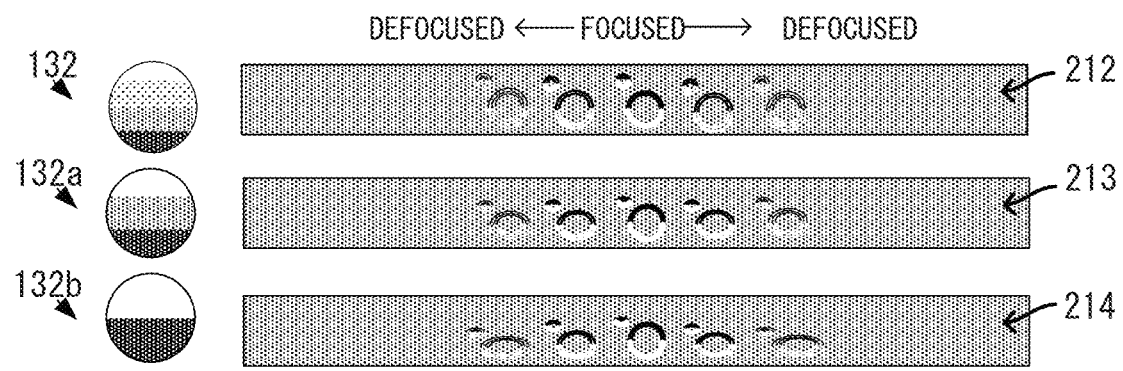
FIG. 12 is a diagram illustrating an example of a relationship between an intensity transmittance distribution of a modulation element and a contrast of an image.

FIG. 12 is a diagram illustrating an example of a relationship between an intensity transmittance distribution of a modulation element and a contrast of an image. Although the microscope apparatus 100 includes the modulation element 113 and the modulation element 132 each having a linear optical density distribution, an optical density distribution of each of the modulation element 113 and the modulation element 132 desirably has at least three intensity transmittances respectively corresponding to different optical densities. Therefore, the modulation element 113 may have an optical density distribution that changes in a stepped shape in a first orientation instead of an optical density distribution that is linear in the first orientation as illustrated in FIG. 7. The modulation element 132 may have an optical density distribution that changes in a stepped shape in a second orientation instead of an optical density distribution that is linear in the second orientation. An image 212 to an image 214 illustrated in FIG. 12 are each an image the contrast of which has been enhanced by image processing and are images respectively acquired using modulation elements having different optical density distributions. The image 212 is an image acquired using a modulation element having a linear optical density distribution. The image 213 is an image acquired using a modulation element having an optical density distribution that changes in three stages. The image 214 is an image acquired using a modulation element having an optical density distribution that changes in two stages. When the optical density distribution of the modulation element has three or more optical densities, as illustrated in FIG. 12, each portion of an observation object can be observed without distorting a defocused image.

Figure 13:
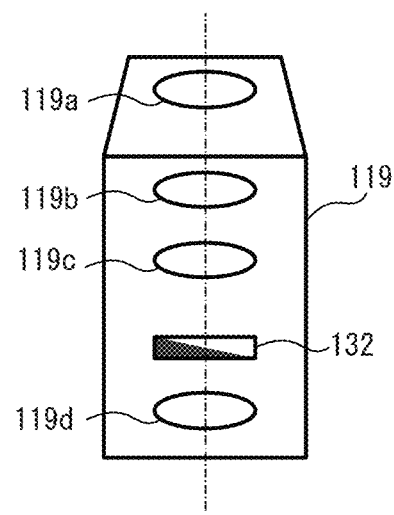
FIG. 13 is a diagram illustrating an example of an objective lens 119 used for the microscope apparatus 100.

FIG. 13 is a diagram illustrating an example of an objective lens 119 used in the microscope apparatus 100. Although an example in which the modulation element 132 as the second intensity modulation section is arranged at a conjugate position of the objective lens 116 using the adapter 130 in the microscope apparatus 100 is illustrated, the modulation element 132 may be arranged at a pupil position of the objective lens. In the case, the pupil position of the objective lens may be positioned in the objective lens. Accordingly, the microscope apparatus 100 may include the objective lens 119 in which the modulation element 132 is accommodated in an objective lens barrel, as illustrated in FIG. 13, instead of the objective lens 116. When an objective lens that accommodates the modulation element is used, the slider 133 is not required, and at the same time an appropriate modulation element can be used for each objective lens.

Figure 14:
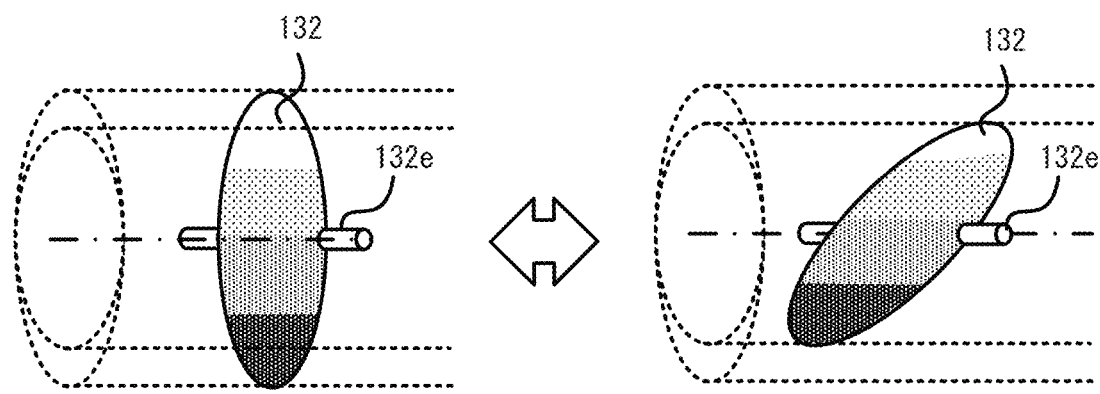
FIG. 14 is a diagram illustrating an example in which an angle of a modulation element is changed.

FIG. 14 is a diagram illustrating an example in which an angle of a modulation element is changed. Although an example in which modulation elements respectively exist for objective lenses, to use the appropriate modulation element corresponding to each of the objective lens is illustrated in FIG. 13, the microscope apparatus 100 may have a structure for changing an angle of a modulation element with respect to an optical axis. The microscope apparatus 100 may include a rotation shaft 132e that rotatably supports the modulation element 132, as illustrated in FIG. 14, for example. In this case, when the rotation shaft 132e is rotated to match a pupil diameter of an objective lens, a region having the highest intensity transmittance and a region having the lowest intensity transmittance in the modulation element 132 can be made to respectively match ends of a pupil. Accordingly, a high contrast can be obtained effectively utilizing an intensity transmittance distribution of the modulation element 132.

Second Embodiment

Figure 15:
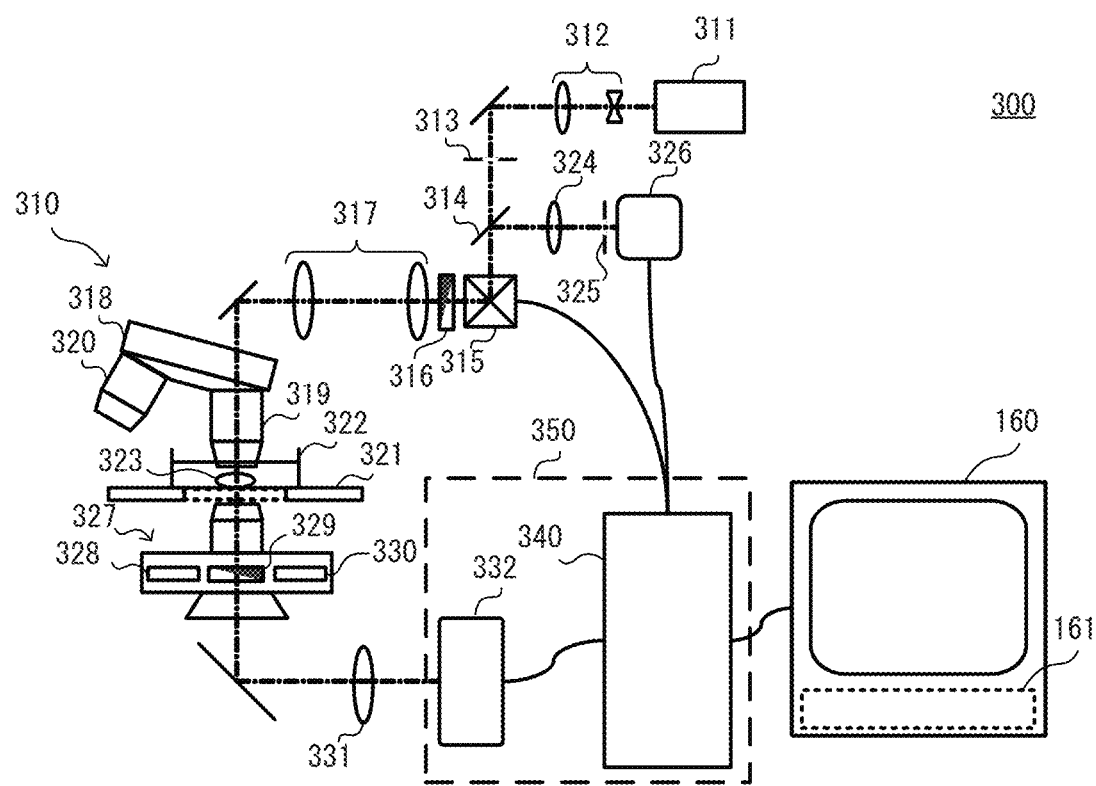
FIG. 15 is a diagram illustrating a configuration of a microscope apparatus 300 according to a second embodiment.

FIG. 15 is a diagram illustrating a configuration of a microscope apparatus 300 according to the present embodiment. The microscope apparatus 300 includes a microscope main body 310, a computer 340, and a display device 160. A PMT 332 and the computer 340 constitute an image acquisition section 350.

The microscope main body 310 is an extension of a laser scanning microscope, and can obtain a confocal image by cooperating with the computer 340. Laser light emitted from a laser light source 311 has its light flux diameter enlarged by a beam expander 312. Then, the laser light is incident on an objective lens 319 mounted on a nose piece 318 via an aperture stop 313, a diachronic mirror 314, a galvano mirror 315, a modulation element 316, and a relay lens 317. The modulation element 316 is a first intensity modulation section, described above.

An objective lens 320 having a different magnification from that of the objective lens 319 is mounted on the nose piece 318 in addition to the objective lens 319. The objective lens 319 collects the laser light, and irradiates one point of a cultured cell 323 in a plastic petri dish 322 placed on a stage 321 with the laser light. A position where the laser light is collected is controllable depending on a polarization direction of the laser light in the galvano mirror 315. Therefore, when the galvano mirror 315 is controlled, the cultured cell 323 can be two-dimensionally scanned.

In the cultured cell 323 irradiated with the laser light, fluorescence is generated, and is incident on the diachronic mirror 314 via the objective lens 319, the relay lens 317, the modulation element 316, and the galvano mirror 315. Then, a confocal aperture 325 is irradiated with the fluorescence reflected on the diachronic mirror 314 by a lens 324, and only the fluorescence generated at a focal point is incident on a photomultiplier tube (hereinafter referred to as PMT) 326 after passing through a pinhole provided in the confocal aperture 325.

The computer 340 two-dimensionally maps a signal to be output from the PMT 326 during scanning of the cultured cell 323 using a scanning position of the laser light, to obtain a confocal image.

The microscope main body 310 further includes a universal condenser 327, a lens 331, and a PMT 332. A plurality of modulation elements (a modulation element 328, a modulation element 329, and a modulation element 330) are accommodated in a turret of the universal condenser 327, and the modulation element selected from among the plurality of modulation elements can be arranged on an optical path. At least one of the pluralities of modulation elements accommodated in the universal condenser 327 is a second intensity modulation section, described above. In this example, the modulation element 329 is a second intensity modulation section.

The laser light transmitted by the cultured cell 323 is incident on the universal condenser 327 after being transmitted by the plastic petri dish 322. Then, the laser light is incident on the PMT 332 via the modulation element 329 in the universal condenser 327 and the lens 331.

The computer 340 two-dimensionally maps a signal to be output from the PMT 332 during the scanning of the cultured cell 323 using the scanning position of the laser light, to obtain a phase gradient image. The computer 340 may perform image processing for enhancing a contrast of the phase gradient image, or a contrast enhancement section 161 in the display device 160 may perform image processing for enhancing the contrast instead of the computer 340.

The microscope apparatus 300 configured as described above makes it possible to obtain a phase gradient image similar to an image obtained by a differential interference microscope simultaneously with the confocal image. Accordingly, for living cells that move, a correlation between a position of a fluorescent dye and a structure of the cells can be accurately grasped.

Third Embodiment

Figure 16:
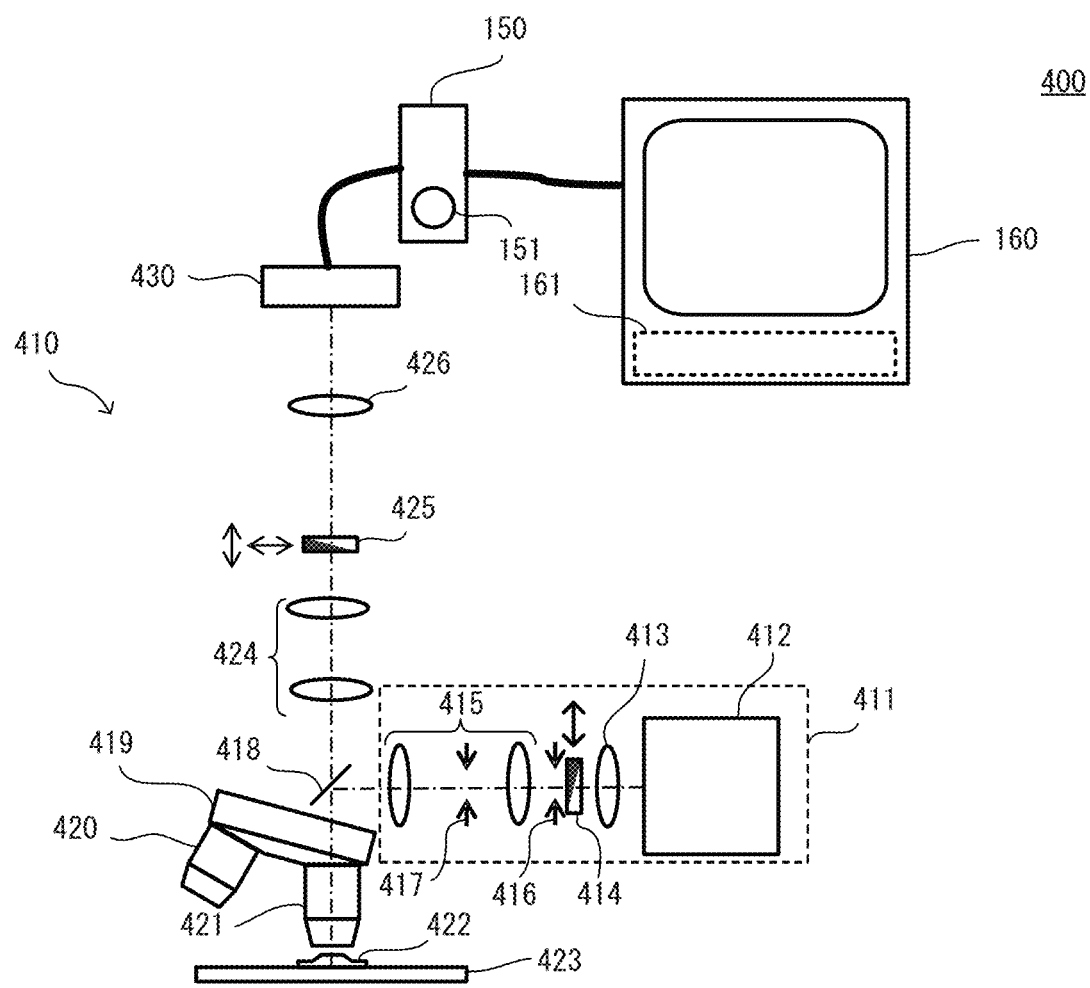
FIG. 16 is a diagram illustrating a configuration of a microscope apparatus 400 according to a third embodiment.

FIG. 16 is a diagram illustrating a configuration of a microscope apparatus 400 according to the present embodiment. The microscope apparatus 400 includes a microscope main body 410, a camera 430, a control device 150, and a display device 160. The camera 430 constitutes an image acquisition section 350.

The microscope main body 410 is a metallurgical microscope. Light emitted from a light source 412 provided in a light projection tube 411 is collimated by a collector lens 413, and is incident on a half mirror 418 via a modulation element 414, an illumination lens 415, an aperture stop 416, and a field stop 417. An observation object 422 placed on a stage 423 is then irradiated with the light reflected on the half mirror 418 by an objective lens 421 mounted on a nose piece 419. An objective lens 420 having a different magnification from that of the objective lens 421 is mounted on the nose piece 419 in addition to the objective lens 421.

The modulation element 414 is a first intensity modulation section, described above, and is arranged in the vicinity of a position optically conjugate with a pupil of the objective lens 421. The modulation element 414 is arranged to be insertable into and removable from an illumination optical path. The modulation element 414 may be arranged to be insertable into and removable from the illumination optical path by being fixed to a slider, as illustrated in FIG. 8, for example. The microscope apparatus 400 may include a first rotation section that rotates the modulation element 414 around an optical axis. The first rotation section may have a structure including a dial and a belt, as illustrated in FIG. 8, and may cause the modulation element 414 to rotate around the optical axis by rotating the dial, for example.

Light reflected by the observation object 422 is incident on a modulation element 425 via the objective lens 421, the half mirror 418, and a pupil relay lens 424. The modulation element 425 is a second intensity modulation section, described above, and is arranged in the vicinity of a position optically conjugate with the pupil of the objective lens 421. The modulation element 425 is arranged to be insertable into and removable from an observation optical path. The modulation element 425 may be arranged to be insertable into and removable from the observation optical path by being fixed to a slider, as illustrated in FIG. 8, for example. The microscope apparatus 400 may include a second rotation section that rotates the modulation element 425 around an optical axis. The second rotation section may have a structure including a dial and a belt, as illustrated in FIG. 8, for example, and may cause the modulation element 425 to rotate around the optical axis by rotating the dial, for example. Further, the microscope apparatus 400 may include a movement section that moves the modulation element 425 in an optical axis direction. An example of the movement section may be a ball screw that slides a slider to which the modulation element 425 is fixed in the optical axis direction.

Light transmitted by the modulation element 425 is collected on the camera 430 by an imaging lens 426, to form an optical image of the observation object 422. The camera 430 is an image acquisition section that acquires image data of an observation object, and may be a contrast enhancement section that enhances a contrast of an image of the observation object to be displayed on the display device 160 based on the image data. The display device 160 may perform enhancement processing for enhancing the contrast of the image of the observation object to be displayed on the display device 160 based on the image data instead of the camera 430.

The microscope apparatus 400 configured as described above makes it possible to obtain a phase gradient image similar to an image obtained by a differential interference microscope by adding modulation elements having a complementary relationship to the existing metallurgical microscope. The microscope apparatus 400 can also be used as a normal metallurgical microscope by removing the modulation elements from an optical path. Further, the microscope apparatus 400 can adjust a direction in which a contrast is provided in the phase gradient image, i.e., a direction in which a phase gradient is detected by rotating the modulation elements around the optical axis while maintaining the complementary relationship between the modulation elements.

Fourth Embodiment

Figure 17:
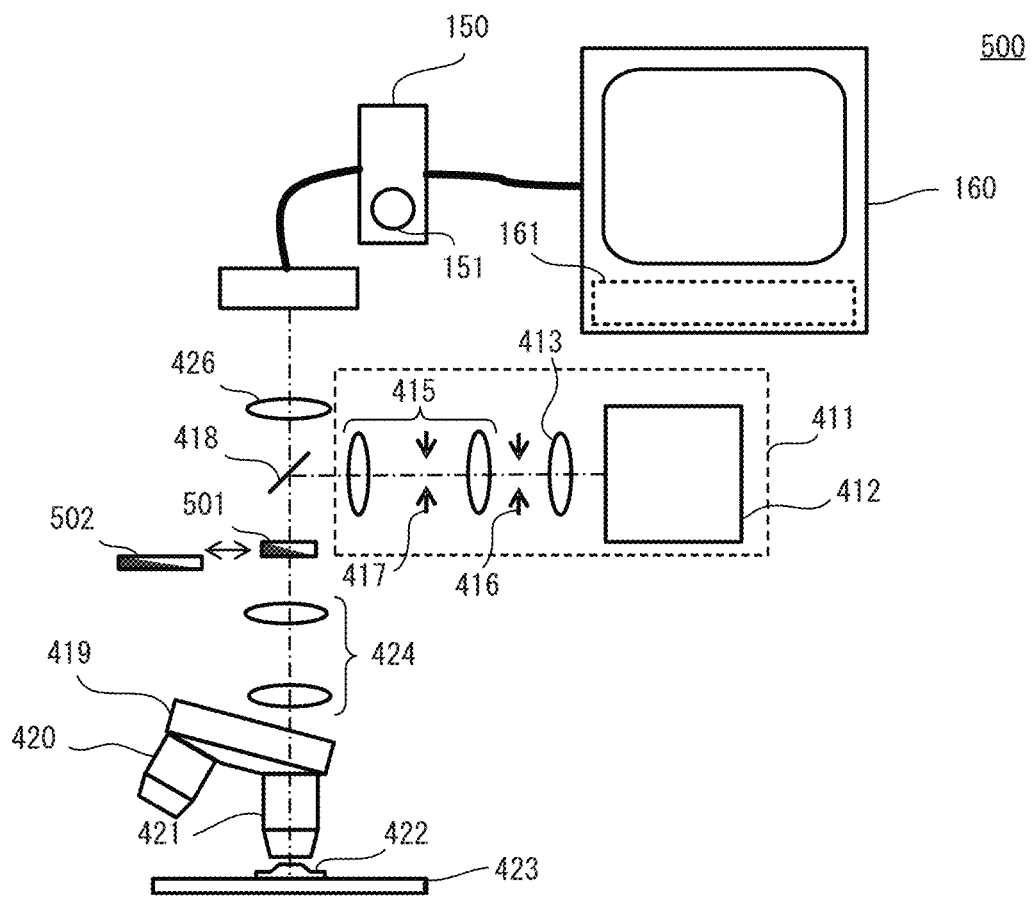
FIG. 17 is a diagram illustrating a configuration of a microscope apparatus 500 according to a fourth embodiment.

FIG. 17 is a diagram illustrating a configuration of a microscope apparatus 500 according to the present embodiment. The microscope apparatus 500 differs from the microscope apparatus 400 in that it includes a modulation element 501 instead of the modulation element 414 and the modulation element 425 and in that a pupil relay lens 424 is arranged on the side closer to an object than a half mirror 418. Other points are similar to those in the microscope apparatus 400.

The modulation element 501 is an intensity modulation section that is arranged at a position optically conjugate with an exit pupil position of an objective lens 421 shared by an illumination optical system and an observation optical system and modulates an intensity distribution of illumination light and an intensity distribution of observation light. The modulation element 501 is a gradation filter, for example. An intensity transmittance distribution of the modulation element 501 monotonously decreases in a predetermined orientation perpendicular to an optical axis of the objective lens 421. The illumination light and the observation light to be incident on the modulation element 501 respectively pass through positions symmetric to the optical axis. Accordingly, the modulation element 501 acts on the illumination light similarly to the modulation element 414 in the microscope apparatus 400, and acts on the observation light similarly to the modulation element 425 in the microscope apparatus 400.

Therefore, the microscope apparatus 500 makes it possible to obtain a phase gradient image similar to an image obtained by a differential interference microscope, like the microscope apparatus 400. In the microscope apparatus 500, the modulation element 501 and a modulation element 502 may be used by being switched in response to switching between the objective lens 421 and an objective lens 420, for example. In the microscope apparatus 500, one of the modulation elements may be replaced depending on the objective lens. A direction in which a contrast is provided in the phase gradient image can also be changed by rotating the one modulation element around the optical axis. Accordingly, adjustment work relating to the modulation elements can be significantly simplified.

Fifth Embodiment

Figure 18:
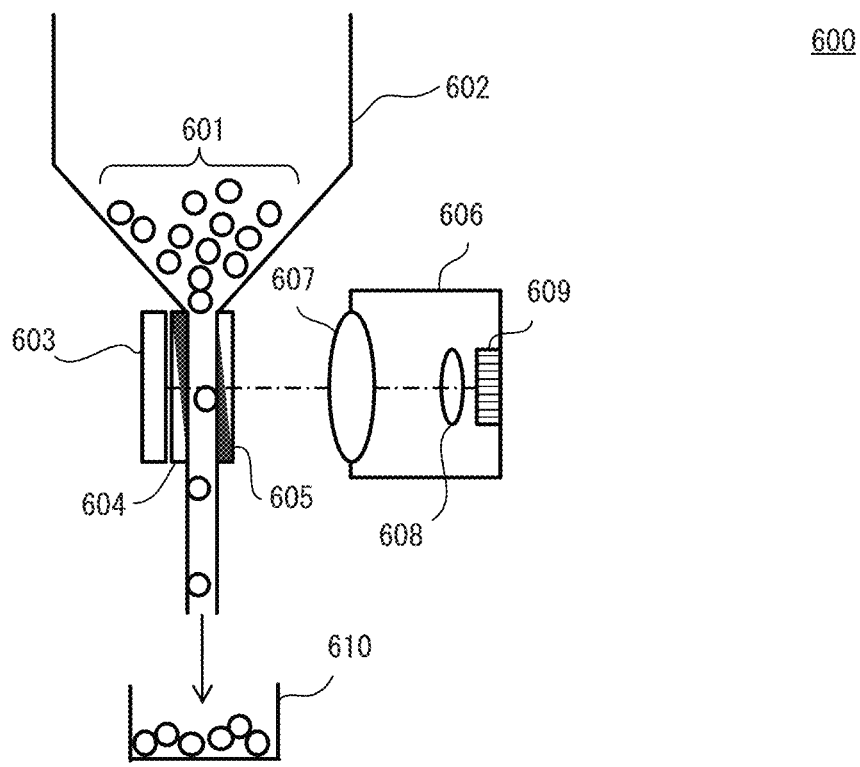
FIG. 18 is a diagram illustrating a configuration of a cell analyzer 600 according to a fifth embodiment.

FIG. 18 is a diagram illustrating a configuration of a cell analyzer 600 according to the present embodiment. The cell analyzer 600 is an example of an observation apparatus, and includes a flow cell 602 that causes cells 601 to be counted, together with a buffer, to flow, an LED light source 603, a modulation element 604, a modulation element 605, a camera 606, and a recovery container 610.

The LED light source 603 is a surface emitting light source, and emits illumination light having a spatially uniform intensity. Accordingly, the LED light source 603 illuminates a space where the cells 601 flow in the flow cell 602 at a substantially uniform intensity with the modulation element 604 removed.

The modulation element 604 is a first intensity modulation section, described above, and the modulation element 605 is a second intensity modulation section, described above. The modulation element 604 and the modulation element 605 are arranged with the flow cell 602 sandwiched therebetween, and have a complementary relationship with respect to an intensity transmittance distribution. Specifically, the modulation element 604 has an optical density that linearly decreases toward the upstream side of the flow cell 602, for example. The modulation element 605 has an optical density that linearly increases toward the upstream side of the flow cell 602, for example.

The camera 606 includes an imaging lens including a lens 607 and a lens 608 and an image pickup device 609. The imaging lens is an afocal macro lens. The camera 606 is arranged such that a focus is positioned between the modulation element 604 and the modulation element 605. The camera 606 acquires an image of the cells 601 that pass between the modulation element 604 and the modulation element 605 based on light detected via the modulation element 604 and the modulation element 605.

The cells 601 have a higher refractive index than that of a buffer flowing together with the cells 601. Accordingly, a phase gradient occurs between the cells 601 and the buffer. Accordingly, in the cell analyzer 600, a phase gradient image in which a contrast is provided in a contour portion of the cells 601 can be obtained. Further, when a processor not illustrated analyzes the phase gradient image, the cell analyzer 600 can count the cells 601 that pass between the modulation element 604 and the modulation element 605.

The cell analyzer 600 configured as described above makes it possible to convert the phase gradient into an image intensity by the modulation elements having the complementary relationship. Accordingly, the cell analyzer 600 does not require a laser light source, unlike the conventional cell analyzer. Accordingly, the cost of the cell analyzer 600 can be more suppressed than that of the conventional cell analyzer so that the cell analyzer 600 can be provided at low cost. The LED light source 603 may be changed into a diffusion plate, and the camera 606 may be changed into a smartphone with a lens adapter. As a result, the cell analyzer can be provided at lower cost.

Figure 19A:
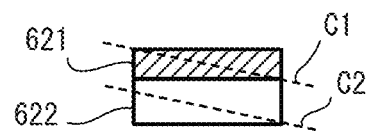
FIG. 19A is a diagram for describing a method of manufacturing a modulation element 620.
Figure 19B:
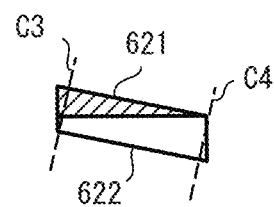
FIG. 19B is another diagram for describing a method of manufacturing the modulation element 620.
Figure 19C:
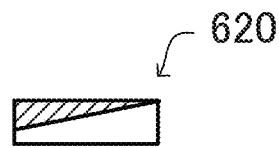
FIG. 19C is still another diagram for describing a method of manufacturing the modulation element 620.

FIG. 19A to FIG. 19C are diagrams for each describing a method of manufacturing a modulation element 620. An example of the method of manufacturing the modulation element will be described below with reference to FIG. 19A to FIG. 19C. First, as illustrated in FIG. 19A, an absorption-type ND filter 621 and a transparent substrate 622 having the same refractive index as that of the ND filter 621 are cemented to each other. The ND filter 621 has a predetermined optical density. Further, both surfaces of a cemented object of the ND filter 621 and the transparent substrate 622 are polished at a predetermined angle with respect to their respective cemented surfaces, to expose a surface C1 and a surface C2. Then, both the surfaces C1 and C2 are respectively bordered with a surface C3 and a surface C4, as illustrated in FIG. 19B. Such work is mainly performed to cause the cemented object between the ND filter 621 and the transparent substrate 622 to fall within a support frame. As a result, the thickness of the ND filter 621 linearly changes, that is, a modulation element 620 including a wedge-shaped ND filter is completed, as illustrated in FIG. 19C. In the modulation element 620, when the thickness of the ND filter 621 linearly changes, the optical density also linearly changes. The manufacturing method illustrated in FIG. 19A to FIG. 19C makes it possible to easily manufacture a modulation element that linearly changes in optical density.

Sixth Embodiment

Figure 20:
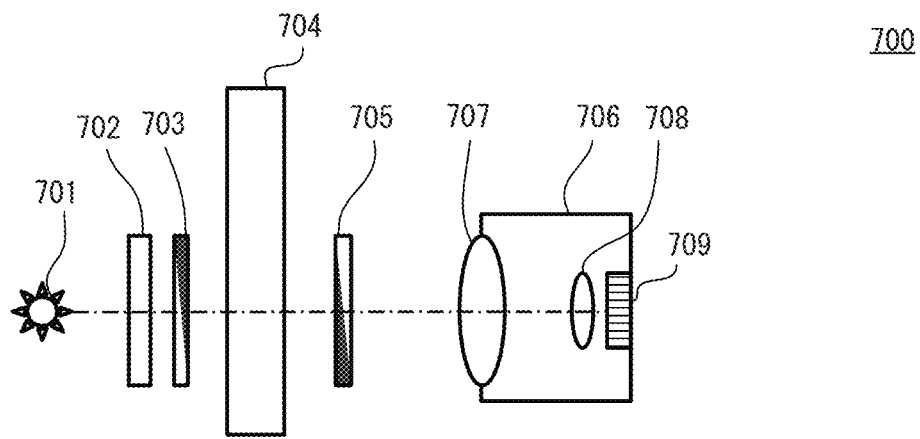
FIG. 20 is a diagram illustrating a configuration of a material inspection apparatus 700 according to a sixth embodiment.

FIG. 20 is a diagram illustrating a configuration of a material inspection apparatus 700 according to the present embodiment. The material inspection apparatus 700 is an apparatus that inspects a transparent inspection material 704, and includes a light source 701, a diffusion plate 702, a modulation element 703, a modulation element 705, and a camera 706.

Light emitted from the light source 701 is diffused by the diffusion plate 702. As a result, illumination light having a substantially uniform intensity is spatially emitted from the diffusion plate 702. Accordingly, the light source 701 and the diffusion plate 702 illuminate the inspection material 704 at a substantially uniform intensity with the modulation element 703 removed.

The modulation element 703 is a first intensity modulation section, described above, and the modulation element 705 is a second intensity modulation section, described above. The modulation element 703 and the modulation element 705 are arranged with the inspection material 704 sandwiched therebetween, and have a complementary relationship with respect to an intensity transmittance distribution. Specifically, one of the modulation element 703 and the modulation element 705 has an optical density that linearly decreases and the other modulation element has an optical density that linearly increases in the same orientation.

The camera 706 includes an imaging lens including a lens 707 and a lens 708 and an image pickup device 709. The camera 706 is arranged such that a focal point is positioned between the modulation element 703 and the modulation element 705, and acquires an image of the inspection material 704 arranged between the modulation element 703 and the modulation element 705 based on light detected via the modulation element 703 and the modulation element 705.

Even in the material inspection apparatus 700 configured as described above, a phase gradient can be converted into an image intensity by the modulation elements having a complementary relationship. Accordingly, a defect in the inspection material 704, unevenness on a surface of the inspection material 704, and the like can be visualized. When a gradient between respective optical densities of the two modulation elements is changed, a sensitivity corresponding to the phase gradient can be changed. Accordingly, the material inspection apparatus 700 can be adjusted to a sensitivity with which the inspection material 704 is easily inspected.

The above-described embodiments respectively represent specific examples for making understanding of the invention easy, and the embodiments of the present invention are not limited to these. Some of the above-described embodiments may be applied to the other embodiment to form still another embodiment of the present invention. The observation apparatus can be subjected to various modifications and variations without departing from the scope of the claims.

Although an example in which the two intensity modulation sections (the first intensity modulation section and the second intensity modulation section) are each an optical filter having an intensity transmittance distribution has been illustrated in the above-described embodiments, the intensity modulation sections may each include an optical mirror the intensity reflectance of which has a distribution. In the case, the two intensity modulation sections may have a complementary relationship with respect to intensity reflectance distributions. Both the intensity transmittance distribution of the intensity modulation section and the intensity reflectance distribution of the intensity modulation section are distributions each representing a ratio of the intensity of light to be incident on the intensity modulation section and the intensity of light to be emitted from the intensity modulation section. Both the intensity transmittance distribution of the intensity modulation section and the intensity reflectance distribution of the intensity modulation section are each an example of a light utilization ratio distribution representing a light utilization ratio in the intensity modulation section. Accordingly, in the observation apparatus, it suffices that the first light utilization ratio distribution of the first intensity modulation section monotonously decreases in the first orientation, and the second light utilization ratio distribution of the second intensity modulation section monotonously increases in the second orientation corresponding to the first orientation.

Although a wavelength is not particularly referred to in the above-described embodiments, the two intensity modulation sections may have a complementary relationship with respect to the light utilization ratio distributions for each wavelength. For example, the first light utilization ratio distribution for a first wavelength of the first intensity modulation section may monotonously decrease in the first orientation, and the second light utilization ratio distribution for the first wavelength of the second intensity modulation section may monotonously increase in the second orientation corresponding to the first orientation. Further, the first light utilization ratio distribution for a second wavelength different from the first wavelength of the first intensity modulation section may monotonously decrease in a third orientation different from the first orientation, and the second light utilization ratio distribution for the second wavelength of the second intensity modulation section may monotonously increase in a fourth orientation corresponding to the third orientation. In this case, phase gradients in the two directions can be detected at one time using the first wavelength and the second wavelength.

Although the intensity transmittance distribution and the light utilization ratio distribution have been described as "monotonously decrease" or "monotonously increase" in the above-described embodiments, the present invention is not necessarily limited to this. To obtain an effect of the present invention, the composite intensity transmittance distribution may have a relationship in which it monotonously increases or monotonously decreases depending on a shift amount in the vicinity of a shift amount of zero, as illustrated in FIG. 3. Therefore, the intensity transmittance distribution and the light utilization ratio distribution may "decrease" or "increase". "Decrease" of the intensity transmittance and the light utilization ratio distribution in the first orientation also includes a case where they decrease as a whole, and means that respective differential values corresponding to positions in the first orientation of the intensity transmittance distribution and the light utilization ratio distribution are zero or less at most positions and respective minimum values of the differential values are not zero. "Increase" of the intensity transmittance and the light utilization ratio distribution in the second orientation also includes a case where they increase as a whole, and means that respective differential values corresponding to positions in the second orientation of the intensity transmittance distribution and the light utilization ratio distribution are zero or more at most positions and respective maximum values of the differential values are not zero. Here, "decrease as a whole" or "increase as a whole" includes a case where a part of the whole a large part of which decreases may conversely increase or a case where a part of the whole a large part of which increases may conversely decrease. Most positions are desirably 70% or more and more desirably 90% or more, for example, of positions on which the modulation element effectively acts.

What is claimed is:

1. An observation apparatus comprising:
   a first intensity modulation section arranged on an optical path of illumination light with which an observation object is to be irradiated, the first intensity modulation section modulating an intensity distribution of the illumination light; and
   a second intensity modulation section arranged on an optical path of observation light from the observation object irradiated with the illumination light, the second intensity modulation section modulating an intensity distribution of the observation light,
   wherein:
   a first light utilization ratio distribution of the first intensity modulation section monotonously decreases in a first orientation, such that a differential value of the first light utilization ratio distribution corresponding to the first orientation is zero or a negative value at any position of the first light utilization ratio distribution, and a minimum value of the differential value along the first light utilization ratio distribution is non-zero, and
   a second light utilization ratio distribution of the second intensity modulation section monotonously increases in a second orientation corresponding to the first orientation, such that a differential value of the second light utilization ratio distribution corresponding to the second orientation is zero or a positive value at any position of the second light utilization ratio distribution, and a maximum value of the differential value along the second light utilization ratio distribution is non-zero.

2. The observation apparatus according to claim 1, further comprising:
   an image acquisition section that acquires image data of the observation object based on the observation light modulated by the second intensity modulation section, and
   a contrast enhancement section that performs processing for enhancing a contrast of an image of the observation object based on the image data acquired by the image acquisition section.

3. The observation apparatus according to claim 1, wherein a product of a first light utilization ratio of the first intensity modulation section and a second light utilization ratio of the second intensity modulation section with respect to an on-axis principal ray forming an optical image of the observation object is substantially equivalent to a product of a first light utilization ratio of the first intensity modulation section and a second light utilization ratio of the second intensity modulation section with respect to an off-axis principal ray forming the optical image.

4. The observation apparatus according to claim 1, wherein the second intensity modulation section is arranged at a position optically conjugate with the first intensity modulation section.

5. The observation apparatus according to claim 4, further comprising:
   an illumination optical system that irradiates the observation object with the illumination light, and
   an observation optical system that guides observation light into a detector,
   wherein:
   the first intensity modulation section is arranged at a pupil position of the illumination optical system, in a vicinity of the pupil position of the illumination optical system, at a position optically conjugate with the pupil, or in a vicinity of the position optically conjugate with the pupil, and
   the second intensity modulation section is arranged at a pupil position of the observation optical system, in a vicinity of a pupil position of the observation optical system, at a position optically conjugate with the pupil, or in a vicinity of the position optically conjugate with the pupil.

6. The observation apparatus according to claim 1, further comprising:
   an aperture stop,
   wherein the aperture stop has at least one of a structure for adjusting an aperture diameter and a centering structure.

7. The observation apparatus according to claim 1, further comprising a movement section that moves the second intensity modulation section in an optical axis direction.

8. The observation apparatus according to claim 1, wherein the first intensity modulation section and the second intensity modulation section are arranged to be insertable into and removable from an optical path.

9. The observation apparatus according to claim 1, further comprising:
   a first rotation section that rotates the first intensity modulation section around an optical axis, and
   a second rotation section that rotates the second intensity modulation section around an optical axis.

10. The observation apparatus according to claim 1, wherein:
    a first light utilization ratio distribution for a first wavelength of the first intensity modulation section decreases in the first orientation,
    a second light utilization ratio distribution for the first wavelength of the second intensity modulation section increases in the second orientation,
    a first light utilization ratio distribution for a second wavelength different from the first wavelength of the first intensity modulation section decreases in a third orientation different from the first orientation, and
    a second light utilization ratio distribution for the second wavelength of the second intensity modulation section increases in a fourth orientation corresponding to the third orientation.

11. The observation apparatus according to claim 1, wherein:
    each of the first intensity modulation section and the second intensity modulation section comprises an optical filter, and
    each of the first light utilization ratio distribution and the second light utilization ratio distribution is an intensity transmittance distribution.

12. The observation apparatus according to claim 11, wherein the optical filter comprises an absorption-type ND filter having a wedge shape.

13. The observation apparatus according to claim 1, wherein:
    each of the first intensity modulation section and the second intensity modulation section comprises an optical mirror, and each of the first light utilization ratio distribution and the second light utilization ratio distribution is a reflectance distribution.

14. The observation apparatus according to claim 1, wherein the observation apparatus comprises a microscope apparatus.

15. The observation apparatus according to claim 1, wherein the observation apparatus comprises a cell analyzer.

16. The observation apparatus according to claim 1, wherein the observation apparatus comprises a material inspection apparatus.

17. An observation apparatus comprising:

a first intensity modulation section arranged on an optical path of illumination light with which an observation object is to be irradiated, the first intensity modulation section modulating an intensity distribution of the illumination light; and a second intensity modulation section arranged on an optical path of observation light from the observation object irradiated with the illumination light, the second intensity modulation section modulating an intensity distribution of the observation light, wherein:

a first light utilization ratio distribution of the first intensity modulation section decreases in a first orientation, a second light utilization ratio distribution of the second intensity modulation section increases in a second orientation corresponding to the first orientation, the first light utilization ratio distribution includes at least three light utilization ratios respectively corresponding to optical densities different from one another, and the second light utilization ratio distribution includes at least three light utilization ratios respectively corresponding to optical densities different from one another.

18. The observation apparatus according to claim 17, wherein:

an optical density distribution represented by the first light utilization ratio distribution is a linear distribution in the first orientation, and an optical density distribution represented by the second light utilization ratio distribution is a linear distribution in the second orientation.

19. The observation apparatus according to claim 17, wherein;

an optical density distribution represented by the first light utilization ratio distribution is a distribution that changes in a stepped shape in the first orientation, and an optical density distribution represented by the second light utilization ratio distribution is a distribution that changes in a stepped shape in the second orientation.

20. An observation apparatus comprising:

an illumination optical system that irradiates an observation object with illumination light;

an observation optical system that guides observation light from the observation object into a detector; and an intensity modulation section that modulates both an intensity distribution of the illumination light and an intensity distribution of the observation light, wherein:

the illumination optical system and the observation optical system share an objective lens, the intensity modulation section is arranged at an exit pupil position of the objective lens or a position optically conjugate with the exit pupil position, and a light utilization ratio distribution of the intensity modulation section monotonously decreases in a predetermined orientation perpendicular to an optical axis of the objective lens, such that a differential value of the light utilization ratio distribution corresponding to the predetermined orientation is zero or a negative value at any position of the light utilization ratio distribution, and a minimum value of the differential value along the light utilization ratio distribution is non-zero.

* * * * *